US012288394B2

(12) United States Patent
Chou et al.

(10) Patent No.: US 12,288,394 B2
(45) Date of Patent: Apr. 29, 2025

(54) TRACKING PERFORMANCE DISPLAY METHOD AND HOST

(71) Applicant: HTC Corporation, Taoyuan (TW)

(72) Inventors: Nien Hsin Chou, Taoyuan (TW); Wen Ting Lo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 245 days.

(21) Appl. No.: 18/090,520

(22) Filed: Dec. 29, 2022

(65) Prior Publication Data

US 2023/0215168 A1    Jul. 6, 2023

Related U.S. Application Data

(60) Provisional application No. 63/296,496, filed on Jan. 5, 2022.

(51) Int. Cl.
*G06V 20/20* (2022.01)
*G06T 19/00* (2011.01)

(52) U.S. Cl.
CPC ............ *G06V 20/20* (2022.01); *G06T 19/006* (2013.01)

(58) Field of Classification Search
CPC .............................. G06T 19/006; G06V 20/20
See application file for complete search history.

(56) References Cited

U.S. PATENT DOCUMENTS

| | | | |
|---|---|---|---|
| 2009/0007231 A1* | 1/2009 | Kaiser | G06Q 10/06 726/2 |
| 2009/0252374 A1* | 10/2009 | Ishikawa | G06T 7/246 382/103 |
| 2015/0077434 A1* | 3/2015 | Fukuchi | H04N 7/18 345/633 |
| 2017/0193667 A1* | 7/2017 | Shotton | G06F 3/016 |
| 2019/0383937 A1* | 12/2019 | Comer | G06T 19/006 |
| 2020/0307561 A1* | 10/2020 | Bush | B60W 30/0956 |

FOREIGN PATENT DOCUMENTS

| | | |
|---|---|---|
| TW | 201118803 | 6/2011 |
| TW | 202115677 | 4/2021 |

OTHER PUBLICATIONS

"Office Action of Taiwan Counterpart Application", issued on Nov. 10, 2023, p. 1-p. 8.

* cited by examiner

*Primary Examiner* — Sing-Wai Wu
(74) *Attorney, Agent, or Firm* — JCIPRNET (57) ABSTRACT

Embodiments of the disclosure provide a tracking performance display method and a host. The method includes: visual content is provided in a see-through mode, and the visual content corresponds to a real-world scene; tracking performance associated with the real-world scene is evaluated; and a tracking performance indicator corresponding to the tracking performance is displayed in the visual content.

14 Claims, 5 Drawing Sheets

TRACKING PERFORMANCE DISPLAY METHOD AND HOST

CROSS-REFERENCE TO RELATED APPLICATION

This application claims the priority benefit of U.S. provisional application Ser. No. 63/296,496, filed on Jan. 5, 2022. The entirety of the above-mentioned patent application is hereby incorporated by reference herein and made a part of this specification.

BACKGROUND

Technical Field

The disclosure relates to a tracking technology, and in particular to a tracking performance display method and a host.

Description of Related Art

In existing virtual reality (VR) technology, using simultaneous localization and mapping (SLAM) to perform inside out tracking has already been a common means for a relevant host (such as a head-mounted display (HMD) running VR services).

However, in existing SLAM mechanisms, relevant tracking performance is mostly presented by a corresponding numerical result (such as pose accuracy) and/or a related system event (such as a message showing lost-tracking).

However, in the above-mentioned display methods, the performance of SLAM tracking in certain specific environments cannot be intuitively understood by general users.

SUMMARY

In view of this, the disclosure provides a tracking performance display method and a host, which may be configured to solve the above-mentioned technical problem.

An embodiment of the disclosure provides a tracking performance display method, which is adapted for a host and includes: visual content is provided in a see-through mode, and the visual content corresponds to a real-world scene; tracking performance associated with the real-world scene is evaluated; and a tracking performance indicator corresponding to the tracking performance is displayed in the visual content.

An embodiment of the disclosure provides a host, which includes a storage circuit and a processor. The storage circuit stores a program code. The processor is coupled to the storage circuit and accesses the program code to execute: providing visual content in a see-through mode, and the visual content corresponds to a real-world scene; evaluating tracking performance associated with the real-world scene; and displaying a tracking performance indicator corresponding to the tracking performance in the visual content.

DESCRIPTION OF THE EMBODIMENTS

Figure 1:
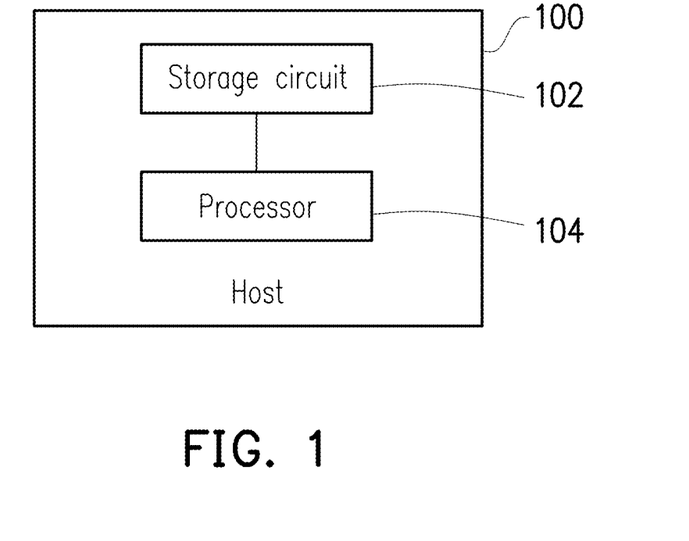
FIG. 1 is a schematic diagram of a host according to an embodiment of the disclosure.

Please refer to FIG. 1, which is a schematic diagram of a host according to an embodiment of the disclosure. In different embodiments, a host 100 may be, for example, implemented as various smart devices and/or computer devices, but may not be limited thereto. In some embodiments, the host 100 is, for example, an HMD that provides various reality services (such as VR services, augmented reality services, mixed reality (MR) services, or other similar services, but may not be limited thereto.

In FIG. 1, the host 100 includes a storage circuit 102 and a processor 104. The storage circuit 102 is, for example, any type of fixed or removable random access memory (RAM), read-only memory (ROM), flash memory, a hard disk or other similar devices or a combination thereof, and may be configured to record multiple program codes or modules.

The processor 104 is coupled to the storage circuit 102, and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA) circuit, any other kind of integrated circuits, state machines, Advanced RISC Machine (ARM) based processors, and similar items.

In the embodiment of the disclosure, the processor 104 may access a module and a program code recorded in the storage circuit 102 to implement the tracking performance display method proposed by the disclosure, and the details of which are described as follows.

Figure 2:
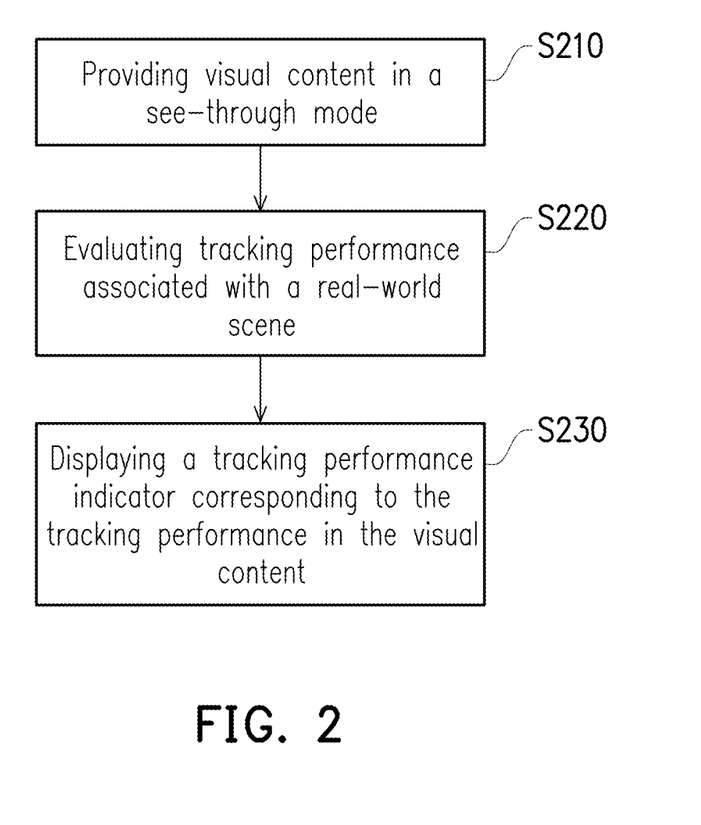
FIG. 2 is a flowchart of a tracking performance display method according to an embodiment of the disclosure.

Please refer to FIG. 2, which is a flowchart of a tracking performance display method according to an embodiment of the disclosure. The method of the embodiment may be executed by the host 100 in FIG. 1, and the details of each step in FIG. 2 are to be described below with the elements shown in FIG. 1.

First, in step S210, the processor 104 provides visual content in a see-through mode.

In an embodiment, when the host 100 operates in the see-through mode, the host 100 may, for example, capture a real-world scene in front of the host 100 and/or a user through a front lens (not shown), and the captured real-world scene is rendered into corresponding visual content (such as VR content) by the processor 104, and then provided to the user for viewing.

In other words, for the user, the real-world scene in front of the user may be observed by the user through the visual content provided by the host 100, but may not be limited thereto.

In step S220, the processor 104 evaluates the tracking performance associated with the real-world scene. In an embodiment, the processor 104 may, for example, perform an inside out tracking function (such as SLAM) on the real-world scene to obtain a tracking result, but may not be limited thereto.

In an embodiment of the disclosure, the real-world scene may include, for example, one or more physical areas. In an embodiment, the processor 104 may, for example, regard the entire real-world scene as a physical area. In another embodiment, the processor 104 may, for example, determine the manner of dividing the real-world scene into multiple physical areas according to a designer's requirements.

In an embodiment, after controlling the front lens to capture an image corresponding to the real-world scene, the processor 104 may, for example, divide the image into multiple image areas according to a preset division method, and determine that the image areas respectively correspond to the one or more physical areas.

For example, the processor 104 may divide the image corresponding to the real-world scene into four image areas such as upper, lower, left, and right, and determine that the image areas respectively correspond to four physical areas. For another example, the processor 104 may divide the image corresponding to the real-world scene into three image areas such as left, center, and right, and determine that the image areas respectively correspond to three physical areas.

In another embodiment, the processor 104 may also automatically recognize the physical area existing in the real-world scene according to a specific image recognition algorithm. For example, after recognizing one or more physical areas in the real-world scene that correspond to one or more architectural structures (such as walls, floors, and/or ceilings), the processor 104 may divide the image corresponding to the real-world scene into image areas respectively corresponding to the architectural structures, but may not be limited thereto.

In a first embodiment, after obtaining the above-mentioned image areas, the processor 104 may, for example, determine the number of feature points in each of the image areas based on SLAM technology as the number of feature points corresponding to each of the physical areas.

Afterwards, the processor 104 may determine whether the number of feature points of each of the physical areas is lower than a number threshold value. In an embodiment, the number threshold value is, for example, the number of feature points sufficient to achieve a good tracking effect, which may be determined by a designer according to requirements, but may not be limited thereto.

In the first embodiment, in response to determining that the number of feature points of one of the physical areas (hereinafter referred to as a first physical area) is lower than the number threshold value, it means that the processor 104 may not be able to track the first physical area well. In this case, the processor 104 may determine that the tracking performance of the first physical area is in a first state (e.g., not good).

On the other hand, in response to determining that the number of feature points of the first physical area is not lower than the number threshold value, it means that the processor 104 may track the first physical area well. In this case, the processor 104 may determine that the tracking performance of the first physical area is in a second state (e.g., good).

In a second embodiment, after obtaining the above-mentioned image areas, the processor 104 may, for example, determine the feature point distribution in each of the image areas based on SLAM technology as the feature point distribution corresponding to each of the physical areas.

Afterwards, the processor 104 may determine whether the feature point distribution of the first physical area satisfies a preset distribution condition. If not, the processor 104 may determine that the tracking performance of the first physical area is in the first state; if yes, the processor 104 may determine that the tracking performance of the first physical area is in the second state.

In the second embodiment, the preset distribution condition is, for example, a feature point distribution condition sufficient to achieve a good tracking effect, which may be determined by the designer according to requirements, but may not be limited thereto.

In an embodiment, the processor 104 may determine whether the feature point distribution of the first physical area indicates that the feature point density corresponding to the first physical area is higher than a density threshold value. If yes, the processor 104 may determine that the feature point distribution of the first physical area satisfies the preset distribution condition and, conversely, the processor 104 may determine that the feature point distribution of the first physical area does not satisfy the preset distribution condition, but may not be limited thereto.

In the second embodiment, the density threshold value is, for example, a feature point distribution density sufficient to achieve a good tracking effect, which may be determined by the designer according to requirements, but may not be limited thereto.

In step S230, the processor 104 displays a tracking performance indicator corresponding to the tracking performance in the visual content.

In an embodiment, in response to determining that the tracking performance is in the first state, the processor 104 may present the tracking performance indicator as a first visual type. In addition, in response to determining that the tracking performance is in the second state, the processor 104 may present the tracking performance indicator as a second visual type.

Figure 3A:
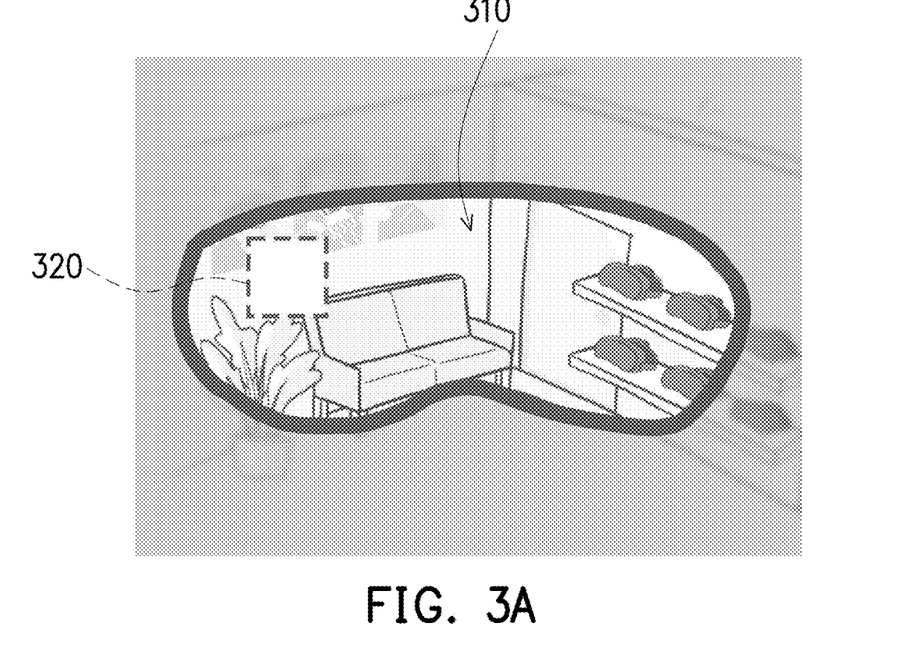
FIG. 3A is a schematic diagram of displaying a tracking performance indicator according to an embodiment of the disclosure.

Please refer to FIG. 3A, which is a schematic diagram of displaying a tracking performance indicator according to an embodiment of the disclosure.

In FIG. 3A, the host 100 operating in the see-through mode may, for example, provide visual content 310 for the user to watch, and the visual content 310 may, for example, correspond to a real-world scene (such as including a sofa, a door, a display shelf, and a plant) in front of the user.

In the scenario of FIG. 3A, it is assumed that the real-world scene as a whole is regarded as a physical area, after determining the tracking performance of the real-world scene, the processor 104 may present a tracking performance indicator 320 corresponding to the tracking performance in the visual content 310.

In an embodiment, the tracking performance indicator 320 may be presented at any specified position in the visual content 310, and may be, for example, implemented as a pattern with a specific geometric shape. In FIG. 3A, if the tracking performance of the real-world scene is in the first state, the processor 104 may, for example, present the tracking performance indicator 320 in a first color (e.g., red) as the first visual type. On the other hand, if the tracking performance of the real-world scene is in the second state, the processor 104 may, for example, present the tracking performance indicator 320 in a second color (e.g., green) as the second visual type, but may not be limited thereto.

In an embodiment, the visual content may include one or more content areas respectively corresponding to the above-mentioned one or more physical areas, and the tracking performance of the real-world scene may include specific tracking performance of each of the physical areas. In this case, the processor 104 may display a specific tracking performance indicator in each of the corresponding content areas according to the specific tracking performance of each of the physical areas.

Figure 3B:
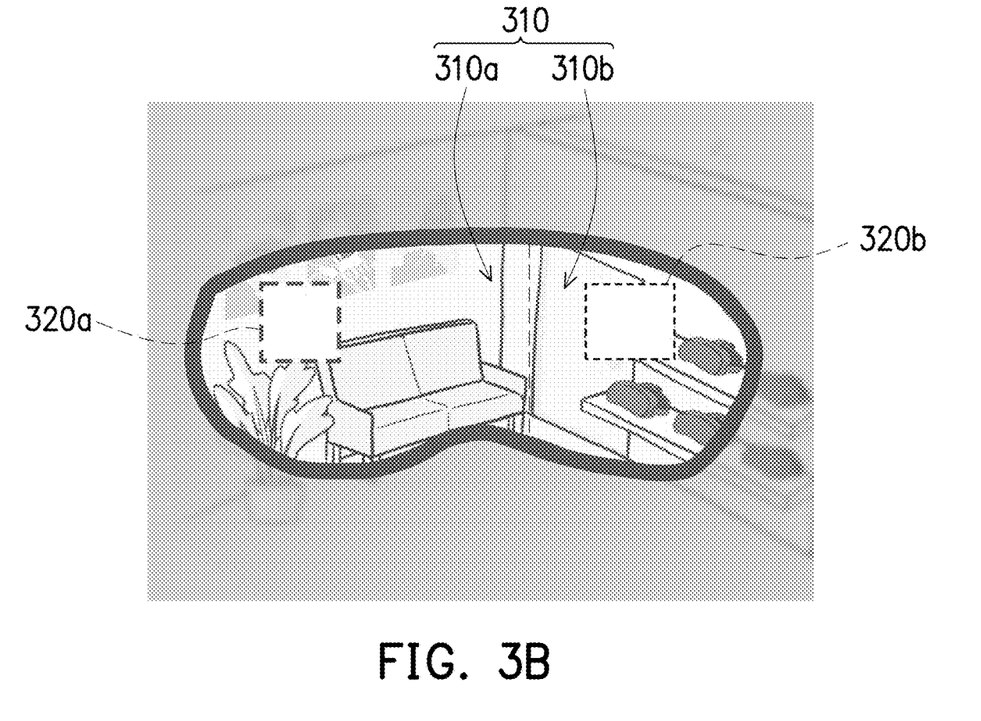
FIG. 3B is a schematic diagram of displaying the tracking performance indicator according to FIG. 3A.

Please refer to FIG. 3B, which is a schematic diagram of displaying the tracking performance indicator according to FIG. 3A. In FIG. 3B, it is assumed that the visual content 310 includes content areas 310a and 310b, which, for example, respectively correspond to two physical areas (hereinafter referred to as the first physical area and a second physical area) in the real-world scene, but may not be limited thereto. In this case, the processor 104 may display a specific tracking performance indicator 320a corresponding to the first physical area in the content area 310a, and display a specific tracking performance indicator 320b corresponding to the second physical area in the content area 310b.

For example, if the specific tracking performance of the first physical area is in the first state (e.g., not good), the processor 104 may, for example, present the specific tracking performance indicator 320a in the first color (e.g., red) as the first visual type. In addition, if the specific tracking performance of the second physical area is in the second state (e.g., good), the processor 104 may, for example, present the specific tracking performance indicator 320b in the second color (e.g., green) as the second visual type, but may not be limited thereto.

Figure 4A:
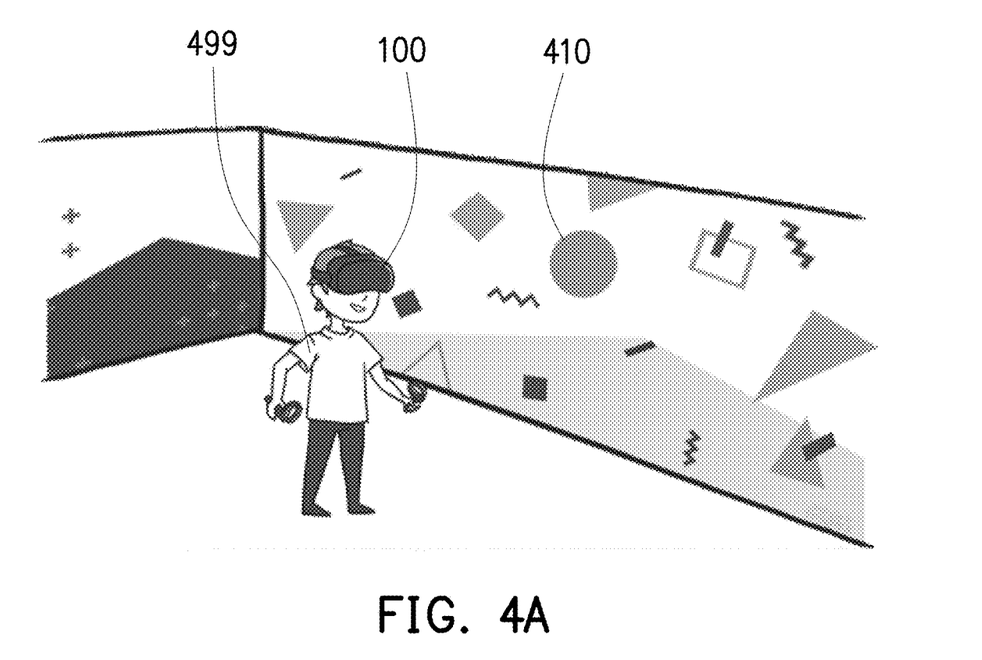
FIGS. 4A and 4B are schematic diagrams of displaying a tracking performance indicator according to another embodiment of the disclosure.
Figure 4B:
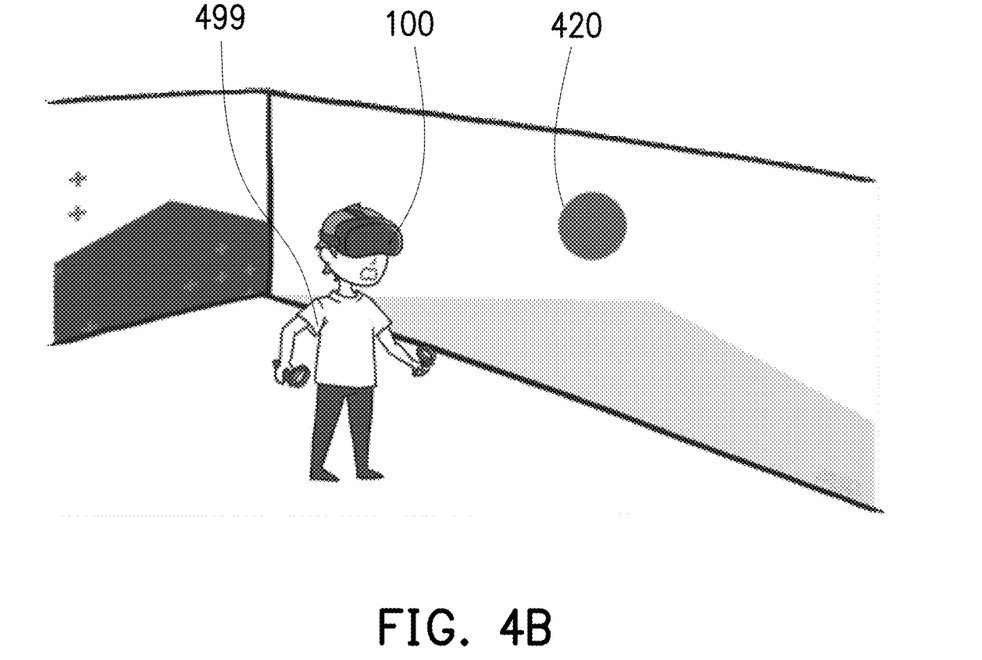

Please refer to FIGS. 4A and 4B, which are schematic diagrams of displaying a tracking performance indicator according to another embodiment of the disclosure. In FIG. 4A, it is assumed that the tracking performance of the real-world scene in front of the host 100 is in the second state (e.g., good), the host 100 may provide a tracking performance indicator 410 (such as a green circle) displayed as the second visual type in the visual content provided to a user 499 to watch.

In FIG. 4B, it is assumed that the tracking performance of the real-world scene in front of the host 100 is in the first state (e.g., not good), the host 100 may provide a tracking performance indicator 420 (such as a red circle) displayed as the first visual type in the visual content provided to the user 499 to watch.

Figure 5:
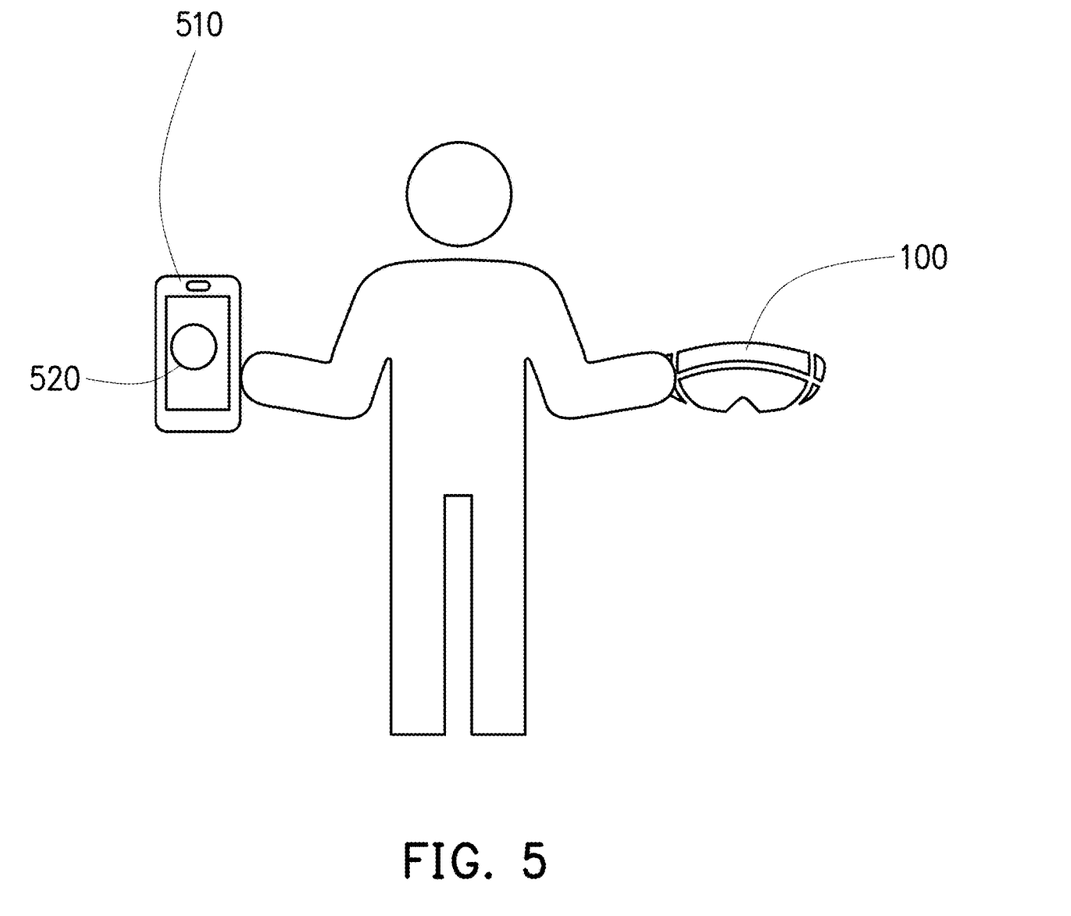
FIG. 5 is an application scenario diagram according to an embodiment of the disclosure.

Please refer to FIG. 5, which is an application scenario diagram according to an embodiment of the disclosure. In FIG. 5, after obtaining the tracking performance of the real-world scene, the host 100 may provide the tracking performance to an electronic device 510 connected to the host 100, so as to trigger the electronic device 510 to present a tracking performance indicator 520 corresponding to the tracking performance.

For example, if the tracking performance of the real-world scene is in the first state, the tracking performance indicator 520 may, for example, appear as the first visual type; if the tracking performance of the real-world scene is in the second state, the tracking performance indicator 520 may, for example, appear in the second visual type. In this way, the user may use the host 100 as a handheld environment scanner, and may determine the tracking performance corresponding to the real-world scene in front of the host 100 according to the tracking performance indicator 520 displayed on the electronic device 510, but may not be limited thereto.

To sum up, the method proposed by the embodiment of the disclosure may use the tracking performance indicators with different visual types (such as patterns with specific colors) in the visual content to indicate the tracking performance corresponding to the real-world scene. Moreover, the method of the embodiment of the disclosure may further provide corresponding specific tracking performance indicators in the content areas corresponding to different physical areas, so as to present the specific tracking performance of different physical areas. In this way, the user may more intuitively know the tracking performance of the real-world scene.

In addition, the method of the embodiment of the disclosure may further provide the tracking performance of the real-world scene to another electronic device, so as to trigger the electronic device to present the corresponding tracking performance indicator. In this way, the user may use the host of the embodiment of the disclosure as a handheld environment scanner, thereby realizing a novel tracking performance display mechanism.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A tracking performance display method, adapted for a host, comprising:
   providing visual content in a see-through mode, wherein the visual content corresponds to a real-world scene, wherein providing the visual content in the see-through mode comprises:
      capturing an image of the real-world scene via a front lens of the host, and rendering the real-world scene as the visual content;
   evaluating tracking performance associated with the real-world scene, comprising:
      performing an inside out tracking function on the image of the real-world scene captured by the front lens to obtain the tracking performance; and
   displaying a tracking performance indicator corresponding to the tracking performance in the visual content, comprising:
      in response to determining that the tracking performance is in a first state, displaying the tracking performance indicator as a first visual type in visual content during the see-through mode; and
      in response to determining that the tracking performance is in a second state, displaying the tracking performance indicator as a second visual type in visual content during the see-through mode.

2. The tracking performance display method according to claim 1, wherein the real-world scene comprises at least one physical area, and evaluating the tracking performance associated with the real-world scene comprises:
   obtaining a number of feature points in each of the physical areas;
   in response to determining that a number of feature points of a first physical area in the at least one physical area is lower than a number threshold value, determining that tracking performance of the first physical area is in the first state; and
   in response to determining that the number of feature points of the first physical area is not lower than the number threshold value, determining that the tracking performance of the first physical area is in the second state.

3. The tracking performance display method according to claim 1, wherein the real-world scene comprises at least one physical area, and evaluating the tracking performance associated with the real-world scene comprises:

in response to determining that a feature point distribution of a first physical area in the at least one physical area does not satisfy a preset distribution condition, determining that tracking performance of the first physical area is in the first state; and in response to determining that the feature point distribution of the first physical area satisfies the preset distribution condition, determining that the tracking performance of the first physical area is in the second state.

4. The tracking performance display method according to claim 3, further comprising:

in response to determining that the feature point distribution of the first physical area indicates that a feature point density corresponding to the first physical area is higher than a density threshold value, determining that the feature point distribution of the first physical area satisfies the preset distribution condition; and in response to determining that the feature point distribution of the first physical area indicates that the feature point density corresponding to the first physical area is not higher than the density threshold value, determining that the feature point distribution of the first physical area does not satisfy the preset distribution condition.

5. The tracking performance display method according to claim 1, wherein the real-world scene comprises at least one physical area, the visual content comprises at least one content area respectively corresponding to the at least one physical area, the tracking performance of the real-world scene comprises specific tracking performance of each of the physical areas, and displaying the tracking performance indicator corresponding to the tracking performance in the visual content comprises:

according to the specific tracking performance of each of the physical areas, displaying a specific tracking performance indicator in each of the content areas corresponding to thereof.

6. The tracking performance display method according to claim 5, wherein the at least one physical area comprises a first physical area and a second physical area, and the at least one content area comprises a first content area and a second content area corresponding to the first physical area and the second physical area, respectively, and according to the specific tracking performance of each of the physical areas, displaying the specific tracking performance indicator in each of the content areas corresponding to thereof comprises:

displaying a first specific tracking performance indicator corresponding to the first physical area in the first content area; and displaying a second specific tracking performance indicator corresponding to the second physical area in the second content area.

7. The tracking performance display method according to claim 6, wherein displaying the first specific tracking performance indicator corresponding to the first physical area in the first content area comprises:

in response to determining that the specific tracking performance corresponding to the first physical area is in the first state, presenting the first specific tracking performance indicator as the first visual type; and in response to determining that the specific tracking performance corresponding to the first physical area is in the second state, presenting the first specific tracking performance indicator as the second visual type.

8. The tracking performance display method according to claim 1, further comprising:

providing the tracking performance associated with the real-world scene to an electronic device connected to the host, wherein the tracking performance associated with the real-world scene triggers the electronic device to display another tracking performance indicator corresponding to the tracking performance.

9. A host, comprising:

a storage circuit, storing a program code; and a processor, coupled to the storage circuit and accessing the program code to execute:

providing visual content in a see-through mode, wherein the visual content corresponds to a real-world scene, wherein providing the visual content in the see-through mode comprises:

capturing an image of the real-world scene via a front lens of the host, and rendering the real-world scene as the visual content;

evaluating tracking performance associated with the real-world scene, comprising:

performing an inside out tracking function on the image of the real-world scene captured by the front lens to obtain the tracking performance; and displaying a tracking performance indicator corresponding to the tracking performance in the visual content, comprising:

in response to determining that the tracking performance is in a first state, displaying the tracking performance indicator as a first visual type in visual content during the see-through mode; and in response to determining that the tracking performance is in a second state, displaying the tracking performance indicator as a second visual type in visual content during the see-through mode.

10. The host according to claim 9, wherein the real-world scene comprises at least one physical area, and the processor executes:

obtaining a number of feature points in each of the physical areas;

in response to determining that a number of feature points of a first physical area in the at least one physical area is lower than a number threshold value, determining that tracking performance of the first physical area is in the first state; and in response to determining that the number of feature points of the first physical area is not lower than the number threshold value, determining that the tracking performance of the first physical area is in the second state.

11. The host according to claim 9, wherein the real-world scene comprises at least one physical area, and the processor executes:

in response to determining that a feature point distribution in a first physical area of the at least one physical area does not satisfy a preset distribution condition, determining that tracking performance of the first physical area is in the first state; and in response to determining that the feature point distribution of the first physical area satisfies the preset distribution condition, determining that the tracking performance of the first physical area is in the second state.

12. The host according to claim 11, wherein the processor further executes:

in response to determining that the feature point distribution of the first physical area indicates that a feature point density corresponding to the first physical area is higher than a density threshold value, determining that the feature point distribution of the first physical area satisfies the preset distribution condition; and in response to determining that the feature point distribution of the first physical area indicates that the feature point density corresponding to the first physical area is not higher than the density threshold value, determining that the feature point distribution of the first physical area does not satisfy the preset distribution condition.

13. The host according to claim 9, wherein the real-world scene comprises at least one physical area, the visual content comprises at least one content area respectively corresponding to the at least one physical area, the tracking performance of the real-world scene comprises specific tracking performance of each of the physical areas, and the processor executes:

according to the specific tracking performance of each of the physical areas, displaying a specific tracking performance indicator in each of the content areas corresponding to thereof.

14. The host according to claim 13, wherein the at least one physical area comprises a first physical area and a second physical area, and the at least one content area comprises a first content area and a second content area corresponding to the first physical area and the second physical area, respectively, and the processor executes:

displaying a first specific tracking performance indicator corresponding to the first physical area in the first content area; and displaying a second specific tracking performance indicator corresponding to the second physical area in the second content area.

* * * * *